United States Patent [19]
Huvey

[11] Patent Number: 5,151,281
[45] Date of Patent: Sep. 29, 1992

[54] DEVICE FOR CONTINUOUS MANUFACTURE OF BENT RODS WITH SHAPED CROSS SECTIONS USING AN INTERMEDIATE STRIP

[75] Inventor: Michel Huvey, Bougival, France

[73] Assignee: Institut Francais du Petrole, Reuil-Malmaison, France

[21] Appl. No.: 491,838

[22] Filed: Mar. 12, 1990

Related U.S. Application Data

[63] Continuation of Ser. No. 269,071, Nov. 9, 1988, abandoned.

[30] Foreign Application Priority Data

Nov. 9, 1987 [FR] France ................ 87 14965

[51] Int. Cl.⁵ .............................. B29C 41/04
[52] U.S. Cl. .................... 425/505; 156/188; 156/190; 156/446; 264/103; 264/166; 264/257; 425/320; 425/391; 425/392; 425/393
[58] Field of Search ............ 156/188, 173, 190, 176, 156/244.13, 446; 425/391, 392, 393, 320, 322, 500, 505, 502, 503, 451.2, 90, 107; 264/166, 103, 257

[56] References Cited

U.S. PATENT DOCUMENTS

| | | | |
|---|---|---|---|
| 2,501,288 | 3/1950 | Nilsson | 425/322 |
| 3,387,348 | 6/1968 | Kilgallon | 425/391 |
| 3,497,413 | 2/1970 | Ullman | 425/391 |
| 3,572,023 | 3/1971 | Galonska | 425/391 |
| 3,943,224 | 3/1976 | Drostholm | 156/446 |
| 3,966,388 | 6/1976 | Bonavent | 425/451.2 |
| 4,074,958 | 2/1978 | Molenaar | 425/391 |

FOREIGN PATENT DOCUMENTS

| | | | |
|---|---|---|---|
| 2312356 | 12/1976 | France | 264/257 |
| 2494401 | 5/1982 | France | 264/257 |
| 2088320 | 6/1982 | United Kingdom | 264/257 |

Primary Examiner—Tim Heitbrink
Attorney, Agent, or Firm—Antonelli, Terry, Stout & Kraus

[57] ABSTRACT

An apparatus for continuous manufacture of bent rods having a shaped cross section from a reinforced stabilizing material, produced inside a supporting mold wound on a mandrel and containing reinforcing elements impregnated with stabilizable material. The material is stabilized over at least a portion of a length of the mandrel, with the bent rods being adapted to be used in reinforcements for flexible tubing.

15 Claims, 2 Drawing Sheets

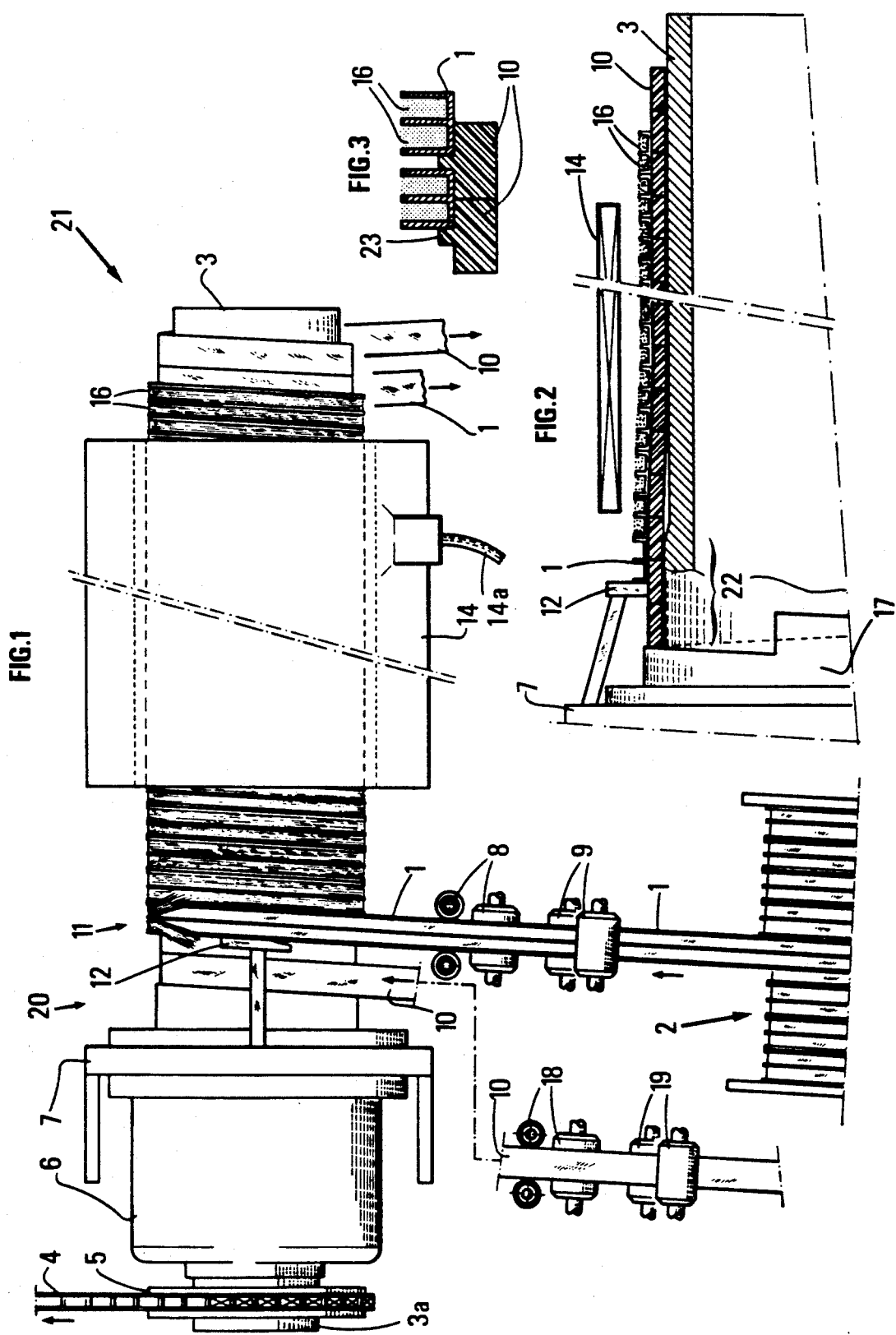

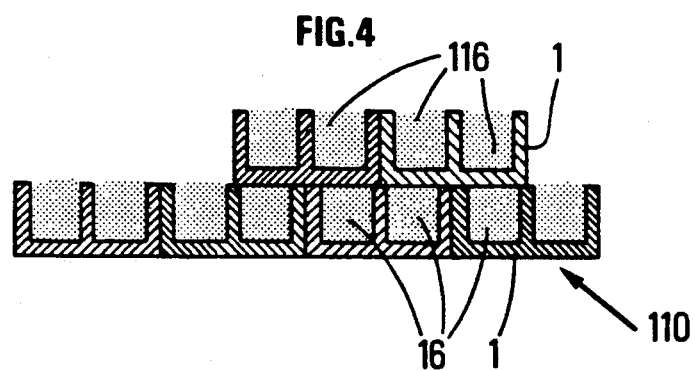

DEVICE FOR CONTINUOUS MANUFACTURE OF BENT RODS WITH SHAPED CROSS SECTIONS USING AN INTERMEDIATE STRIP

This is a continuation of application Ser. No. 269,071, filed Nov. 9, 1988, now abandoned.

SUMMARY OF THE INVENTION

The present invention relates to an improvement in apparatus for the continuous manufacture of bodies with shaped cross sections from reinforced stabilizable material. Such apparatus comprises in particular a combination of a mandrel caused to rotate about a longitudinal axis and a support wound helically on said mandrel. The bodies with shaped cross sections can be bent rods made of reinforced stabilizable material.

Rods of this kind can be used to fabricate rigid or flexible shafts, such as pipes, resistant to differential pressure, tensile, compression, twisting, or bending forces.

The term "stabilizable material" is defined as a body which can assume a stable form after undergoing a physical or chemical process, such as melting followed by cooling, or cross-linking. These materials can be, for example, thermoplastic materials, thermosetting materials, elastomers, or metals.

BACKGROUND OF THE INVENTION

Prior techniques for manufacturing shaped rods with a hollow cross section by using a mandrel are described for example in U.S. application 3,966,388 and FR-A-2,312,356, as well as French patent application EN. 86/05.093, which relates to a support for molding several rods simultaneously.

Industrial use of these techniques, however, lacks flexibility of the manufacturing device, as manifested primarily by irregular feed of the mold support to the mandrel, with this negative factor being intensified when the rate of manufacture and/or the length of the mandrel increase.

The length of the mandrel depends on the time required to stabilize the material of which the rods are made. In general, this length increases directly with the rotational speed of the mandrel, itself a direct function of the rate of manufacture.

Using a long stabilizing oven allows material to be used that stabilizes slowly, such as non-reactive resins, thus making it possible to benefit from numerous advantages associated with this material, such as pre-cross-linking.

This irregular feed is accompanied by jamming of the support and/or the shaped material as the support is wound on the mandrel, during its travel, or during its removal.

These jams can cause deformation of the sections and especially of the bent rods, which imposes harmful restraints on their use, especially when they are finally installed, for manufacturing tubing.

SUMMARY OF THE INVENTION

The present invention proposes a process for continuous manufacture of bent rods with shaped sections, from a reinforced stabilizable material, with manufacture occurring inside a supporting mold wound on a mandrel, in which mold reinforcing elements impregnated with stabilizable material are placed, after which the material is stabilized over at least a part of the length of the mandrel.

The process is characterized by an intermediate strip being wound continuously onto the mandrel, starting at one end of the latter, onto which strip the supporting mold is then wound, and by the intermediate strip being separated from the mandrel at the other end of the mandrel.

Thus, due to this intermediate strip cooperating with the supporting mold, the risks of overlapping and jamming of the turns of the supporting mold are considerably reduced, the longitudinal friction of the supporting mold (and hence of the intermediate strip) are reduced, the circumferential entrainment of the shaped section by the capstan effect is better regulated, and the longitudinal entrainment caused by the support being inserted between the feed to the mandrel and the last turn of the support introduced, is much more stable. The length of the mandrel can be increased without any risk to production.

As an example, when manufacturing shaped rods in a grooved mold without using an intermediate strip, the average length of the rods produced between two manufacturing incidents requiring suspension of manufacture was approximately 500 meters, while with the process according to the invention, using the intermediate strip, 4500 meters of shaped rod have been produced with no problems.

When the intermediate strip forms a succession of turns, the mold can be made to straddle two consecutive turns of the intermediate strip.

The intermediate strip can be bent to match the curvature of the mandrel.

The intermediate strip can be recycled continuously, leaving the end of the mandrel and being fed back to the beginning.

The supporting mold containing the reinforcing elements impregnated with stabilized material which form the rods can be used as an intermediate strip.

The supporting mold must not be wider than the intermediate strip.

The present invention also proposes an apparatus for continuous manufacture of bent rods with shaped cross sections, with the apparatus comprising a combination of a mandrel, means for rotating the mandrel around its longitudinal axis, a helical supporting mold adapted to be wound around the mandrel and having a cross section corresponding to that of the section to be produced, means for continuously winding the supporting mold, means for continuously winding the reinforcing elements impregnated with stabilizable material, stabilizing means provided over at least a part of the length of the mandrel, and means to separate the shaped and reinforced material from the mandrel after the material has been subjected at least partly to stabilization.

This apparatus is characterized in particular by also comprising an intermediate helical strip located between the mandrel and the supporting mold, means for continuously winding the intermediate strip, means for causing the strip to progress longitudinally along the mandrel, and means for separating the intermediate strip from the mandrel.

When the intermediate strip forms a series of turns, the apparatus can comprise means for locating the supporting mold so that it straddles two consecutive turns of the intermediate strip.

The intermediate strip can cooperate with the supporting mold to cause the latter to rotate.

The intermediate strip can be a bent strip whose curvature can be essentially equal to that of the mandrel.

The intermediate strip can comprise a shaped section of reinforced stabilizable material.

The mandrel can comprise a first raised zone or alignment area, on which the intermediate strip is wound, with the area being sufficiently long to entrain the strip by the capstan effect and having a length which is limited so as not to impede the progress of the strip along the mandrel.

The intermediate strip can comprise means such as a central shoulder designed to keep the supporting mold straddling the strip.

BRIEF DESCRIPTION OF THE DRAWINGS

The invention will be better understood and its advantages clear from the following description illustrated by the attached drawings wherein.

FIG. 1 is a schematic diagram of the apparatus for manufacturing bent rods, during operation;

FIG. 2 is a longitudinal cross-sectional view through the apparatus of FIG. 1;

FIG. 3 is a partial cross-sectional an intermediate strip relative to a supporting mold, and FIG. 4 is a partial cross-sectional view through an intermediate strip composed of the shaped section obtained with a supporting mold relative to the shaped section with a supporting mold during manufacture.

DETAILED DESCRIPTION

Referring now to the drawings wherein like reference numerals are used throughout the various views to designate like parts and, more particularly, to FIGS. 1-3, according to these FIGS., an intermediate strip 10 is wound on a drum or mandrel 3, with a shaft 3a of the drum 3 being connected to means for rotating the drum or mandrel 3. The means for rotating comprises, for example, a chain 4 engaging a toothed wheel 5 fitted on the shaft 3a, with the shaft 3a riding in a bearing 6, integral with the frame 7, through roller bearings (not shown).

Before being wound on mandrel 3, the intermediate strip 10 passes between guide pulleys 18 and tension pulleys 19.

A feed 17 cooperating with guide pulleys 18 and tension pulleys 19 ensures correct positioning of intermediate strip 10 at one end generally designated by the reference numeral 20 of the mandrel, so that its helical winding is correct. Thus, the means for continuously winding the intermediate strip on the mandrel comprise guide pulleys 18, tension pulleys 19, and feed 17. Feed 17 also serves to shift strip 10 longitudinally on said the mandrel 3.

Intermediate strip 10, driven by the capstan effect by mandrel 3, travels along the latter until it reaches its other end 21, where intermediate strip 10 is removed from mandrel 3.

The turns of intermediate strip 10 are essentially contiguous over the entire length of the mandrel. Mandrel 3 comprises an alignment area 22 with a diameter greater than that of mandrel 3 over its linear length. The length of this area is, for example, between ten and forty times the width of the intermediate strip. The use of such an area 22 is described for example in French patent application EN.87/08.329. To make FIG. 1 easier to understand, the alignment area 22 is not shown to scale.

A hollow shaped support 1 is wound on intermediate strip 10 in the same direction as the intermediate strip 10. This support 1 serves as a mold in continuous manufacture of bent bars with shaped sections.

Support 1, which is supplied from a supply reel 2, passes through guide pulleys 8 and tension pulleys 9 before being positioned by guide 12 to straddle intermediate strip 10.

The means for continuously winding the support mold 1 onto intermediate strip 10 comprise guide pulleys 8 and tension pulleys 9 as well as guide 12.

Support 1 as shown comprises a plurality of longitudinal grooves which, as they are wound onto mandrel 3, are filled with high-strength filaments generally designated by the reference numeral 11, or rovings, previously impregnated with a stabilizable plastic material, which may or may not be capable of adhering to the inside walls of the grooves, depending on their position in the support and depending on the intended goal, and are capable of adhering to the filaments, with this mixture of filaments and stabilizable material forming cores 16 of the shaped support 1 which, after extraction, become reinforced bent rods.

Support 1, also called a supporting mold or shaped mold, after being thus filled, then passes into a oven 14 where it is subjected to heat treatment capable of stabilizing the reinforced plastic material inside said oven.

Oven 14 is powered with energy by any appropriate means such as cable 14a for example, if electrical heating means are used.

Support 1 filled with filaments 11, can be coated with an element that forms a covering. This element can be composed of a strip of plastic or of a shaped element whose cross section is designed to allow it to fit into support 1 before the heat treatment in oven 14, as stated in French Patent 2,494,401, or in French patent application EN.86/05.096.

It is also possible, after stabilizing the plastic material, to extract from the support 1 the shaped bent rods 16 formed by molding, at the other end generally designated by the reference numeral 21 of the mandrel 3. This extraction is accomplished, for example, at a point at the end of the mandrel, by curving the mold around pulleys as shown in French patent application EN86/05.096.

The reinforced bent rods extracted from the support 1 are supplied to a location for storage or use. The support 1 itself can be either stored or recycled continuously, after passing through a device for cleaning the support 1 by suitable means. It is also possible to use a support comprising cores 16 to make a bent rod with several cores.

As a non-limitative example, a hollow support was made having two grooves forming two identical molds with rectangular 5 mm × 7 mm sections and an outside wall thickness and internal partition thickness of 1 mm. This support can be made of RILSAN (trademark for Nylon-11) by a conventional extrusion process. Support 1, whose width is consequently 17 mm, is supported by an intermediate strip 10, 18 mm wide.

The width of the support 1 is advantageously less than that of intermediate strip 10, so as to facilitate the progress of the support 1 and the intermediate strip 10 along the surface of the mandrel 3 and to locate the the support 1 on the intermediate strip so that it is symmetrical to, and straddles, the latter.

Intermediate strip 10, which is abrasion-resistant, is composed, for example, of a composite shaped section, all of whose external faces are made of RILSAN (trademark for Nylon-11) and whose inner core, which is bent, has glass filaments embedded in a stabilized resin. Strips of this kind can be made, for example, by using the process described in French patent 2,494,401, used to make bent abrasion-resistant shaped sections.

Another intermediate strip, which has been used satisfactorily in production, is composed, for example, of a steel section covered with a layer of RILSAN (trademark for Nylon-11) to resist abrasion.

The grooves of the support have been filled with a mixture of 70 parts by weight of continuous strands of unidirectional glass fibers, not twisted, and 30 parts by weight of a mixture of epoxy resin of the bisphenol A diglycidyl ether type (100 parts) and 4,4'-diaminodiphenyl methane (27 parts by weight).

The capstan effect required to cause the support to rotate along with intermediate strip 10 is created by exerting a sufficient pull on the support 1 and/or the rovings 11. Braking the reels holding rovings initially loaded on them can, for example, provide a constant pull of this nature.

The application of the support 1 against the guide 12 at one end of the mandrel produces a translational displacement of all the turns of support 1 on intermediate strip 10 to the other end 21 of mandrel 3.

Intermediate strip 10, which is wound on at one end 20 of the mandrel 3 and unwound at the other end 21, can be continuously recycled between the point where it leaves the mandrel at end 21 and the point where it is wound onto mandrel 3 at end 20.

To facilitate the separation of the mandrel 3 from the intermediate strip 10, pulleys like those described in French Patent 2,312,356 may be located at end 21 of the mandrel 3.

Similarly, the support 1 can be separated from the intermediate strip by other pulleys of the same type.

After passing through oven 14, cores 16 of the shaped support 1, possibly with the support 1, leave the mandrel 3, and the resultant spiral can be used as a reinforcing element to make a strong, lightweight pipe.

To improve slip, especially in the alignment area 22, the contact between the intermediate strip 10 and the mandrel 3 must be slippery and, despite the drops of resin that get on it, must remain so throughout the operation, which can last for months, day and night, for large runs. This goal is achieved by coating the mandrel with hard TEFLON (trademark for polytetra fluorocthylene) and/or lubricating surfaces that rub on each other.

The intermediate strip 10 can comprise means to keep the support 1 on the strip 10. These means can be, for example, a central shoulder 23 (FIG. 3) with supporting mold 1 located on either side.

The support 1 comprising cores 16 can be used as an intermediate strip immediately after manufacture. For this purpose, manufacture of cores 16 begins by using an auxiliary intermediate strip until these cores 16, as they reach end 21 of the mandrel, travel sufficiently further to be fed in at end 20 of the mandrel following the auxiliary intermediate strip. This arrangement has the significant advantage of eliminating frequent replacement of the intermediate strip as it wears. Following extraction of the intermediate strip at the end of the mandrel, the grooved mold can be separated from the shaped section and recycled to manufacture shaped sections, while the shaped section can be stored.

The difference in diameter between the intermediate strip 10 and the support 1 along the mandrel 3 means that there is an increase in the free length of the support 1 between the point where its manufacture ends at end 21 of the mandrel 3 and the point where it is wound on as an intermediate strip at end 20. This increase is taken up by a tensioning device to regulate the extraction of the support 1 and its re-use as the intermediate strip. The support 1 which has not yet been used to make cores 16 or bent rods can also serve as an intermediate strip.

FIG. 4 shows a partial section through an intermediate strip generally designated by the reference numeral 110 composed of a shaped section of a core 16 produced by the support 1 and placed beneath a section 116 during its manufacture in the support 1.

The intermediate strip can be made from a strip of metal, preferably, a metal with a high resistance to elasticity.

To avoid rapid wear of the mandrel and strip, especially the metal strip, the intermediate strip can have an anti-abrasion coating such as a RILSAN (trademark for Nylon-11) coating.

I claim:

1. Apparatus for continuous manufacture of bent rods with shaped cross section, the apparatus comprising a mandrel, mans for rotating said mandrel around a longitudinal axis thereof, a supporting mold adapted to be wound around the mandrel, said mandrel having a cross section matching that of the shaped cross sections of the bent rods to be produced, mans for continuously winding the supporting mold on the mandrel, means for continuously winding reinforcing elements impregnated with stabilizable material within the supporting mold, stabilizing means extending over at least a part of a length of said mandrel, means for separating the shaped section of reinforcing elements with stabilizable material from the mandrel after the material has been subjected to at least partial stabilization, a helical intermediate strip disposed between said mandrel and said supporting mold, means for continuously winding said intermediate strip on said mandrel, means for causing said intermediate strip to progress longitudinally along said mandrel, and means for separating said intermediate strip from said mandrel.

2. Apparatus according to claim 1, wherein the intermediate strip forms a succession of turns, and wherein mans are provided for locating said supporting mold so as to straddle two successive turns of said intermediate strip.

3. Apparatus according to one of claim 1 or 2, wherein said intermediate strip is adapted to cooperate with said supporting mold to rotate the supporting mold.

4. Apparatus according to claim 1, wherein said intermediate strip is a bent strip having a curvature essentially corresponding to a curvature of said mandrel.

5. Apparatus according to claim 1, wherein said intermediate strip is shaped from a reinforced stabilized material.

6. Apparatus according to claim 1 wherein said intermediate strip is a metal strip.

7. Apparatus according to claim 1, wherein said intermediate strip has an anti-abrasion coating on external faces thereof.

8. Apparatus according to claim 1, wherein said mandrel included a first raised zone forming an alignment area for said intermediate strip, said alignment area having a length sufficient to entrain said intermediate strip by a capstan effect and having a limited length so as not to impede progress of said intermediate strip along said mandrel.

9. Apparatus according to claim 1, wherein said intermediate strip includes a shoulder means for maintaining said supporting mold in a position straddling said intermediate strip.

10. Apparatus according to claim 1, wherein the support mold has a width at least equal to a width of said intermediate strip.

11. Apparatus according to claim 22, wherein said intermediate strip is a bent strip having a curvature essentially corresponding to a curvature of said mandrel.

12. Apparatus according to claim 2, wherein said intermediate strip is shaped form a reinforced stabilized material.

13. Apparatus according to claim 2, wherein said intermediate strip is a metal strip.

14. Apparatus according to claim 2, wherein said intermediate strip has an anti-abrasion coating on side surfaces thereof.

15. Apparatus according to claim 2, wherein said mandrel includes a first raised zone forming an alignment area for said intermediate strip, said alignment area having a length sufficient to entrain said intermediate strip by a capstan effect and having a limited length so as not to impeded the progress of said intermediate strip along said mandrel.

* * * * *